April 29, 1952 C. G. MORLEY 2,594,790
FUEL SYSTEM FOR INTERNAL-COMBUSTION ENGINES
Filed March 1, 1948 2 SHEETS—SHEET 1
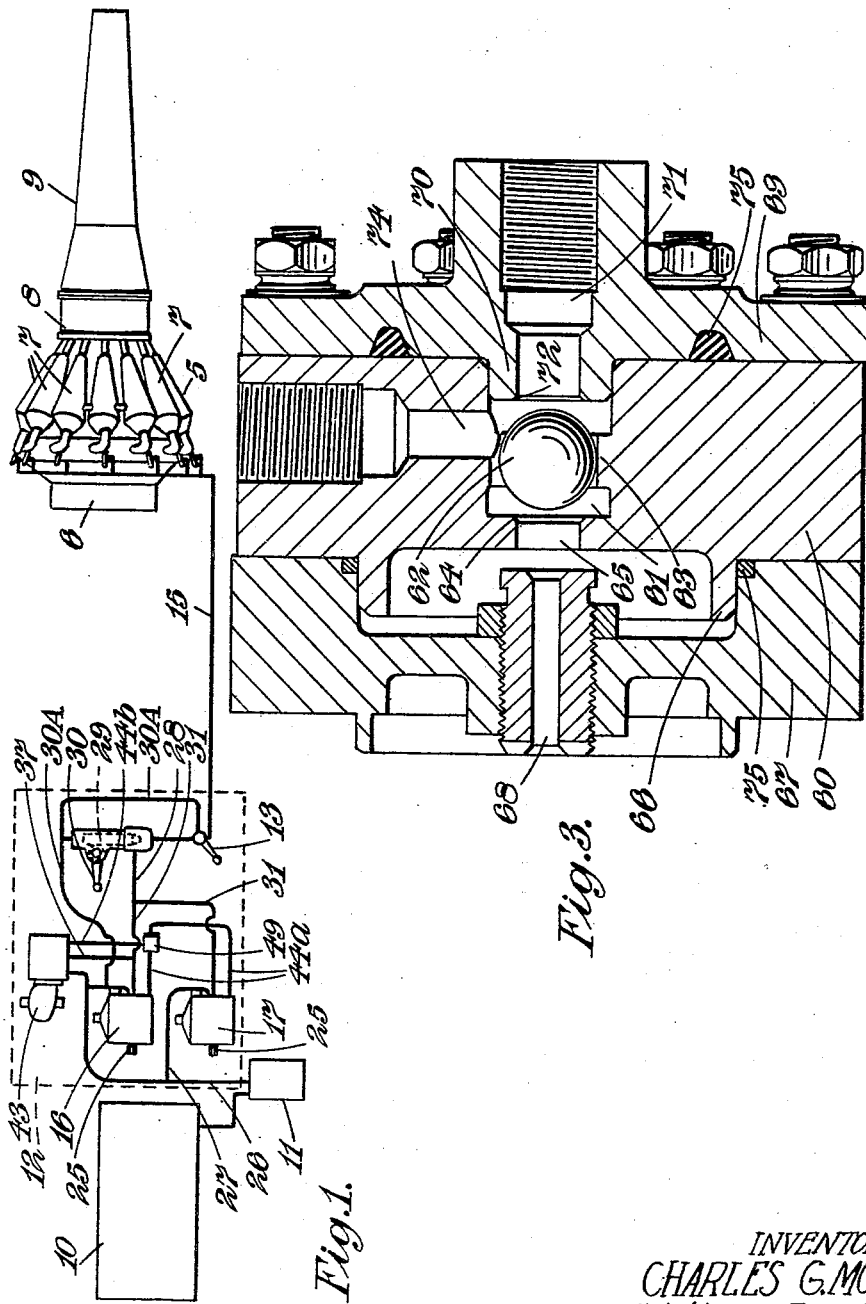
INVENTOR
CHARLES G. MORLEY
BY Wilkinson + Mawhinney
ATTORNEYS

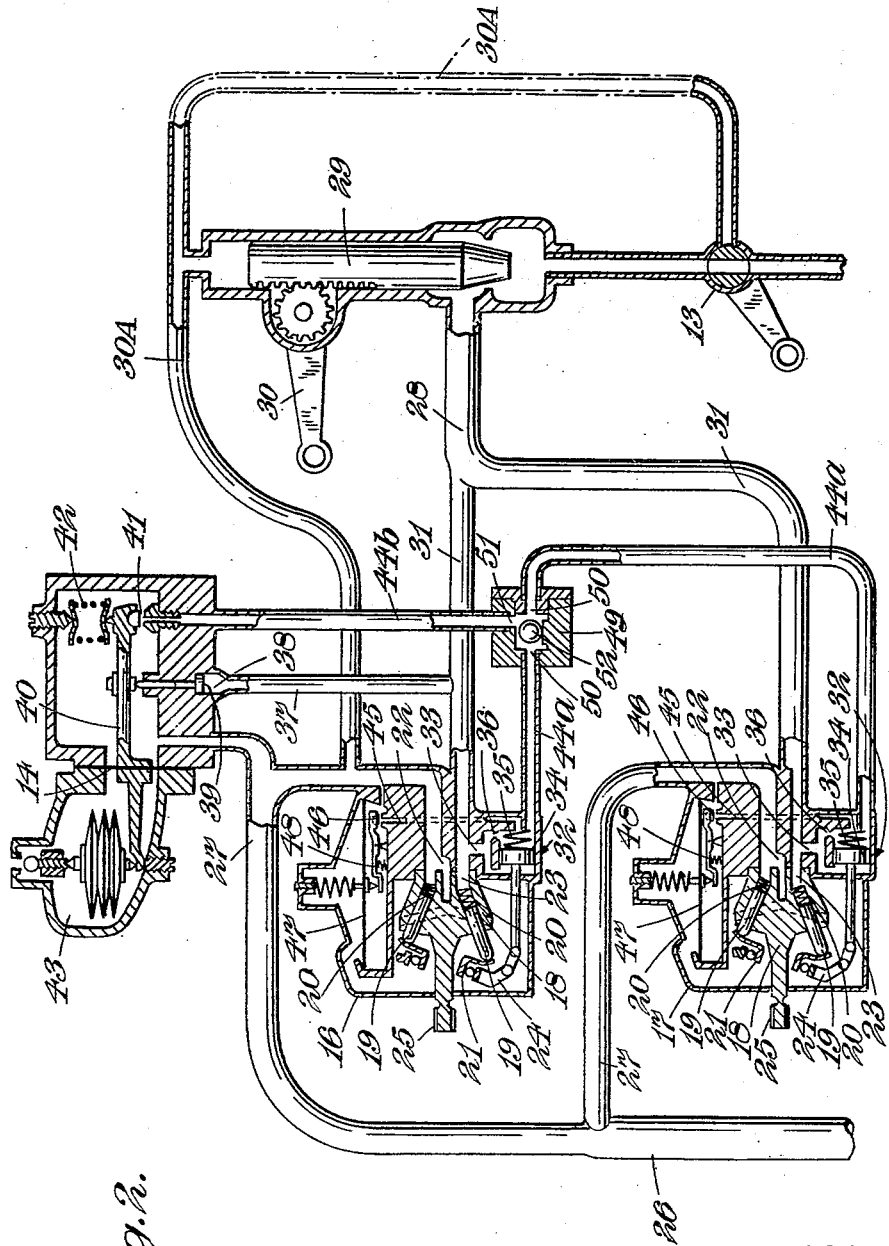

UNITED STATES PATENT OFFICE 2,594,790

FUEL SYSTEM FOR INTERNAL-COMBUSTION ENGINES

Charles Gordon Morley, Ashbourne, England, assignor to Rolls-Royce Limited, Derby, England, a British company Application March 1, 1948, Serial No. 12,453
In Great Britain March 3, 1947

8 Claims. (Cl. 103—11)

This invention relates to internal combustion engines and primarily though not exclusively to gas-turbine-engines, and more particularly relates to fuel systems for such engines.

A gas-turbine engine normally comprises a compressor system, combustion equipment in which fuel is burnt in air received from the compressor system and a turbine system receiving combustion products from the combustion equipment and driving the compressor system. The invention is primarily concerned with gas-turbine engines such as are used for aircraft propulsion in which the propulsive force is derived by jet-reaction, or by arranging for the turbine system to drive an airscrew or by a combination of these arrangements.

In such engines, it is especially desirable from the point of view of safety in operation, and in some cases to facilitate design, to provide a fuel system in which the fuel pumps delivering fuel to the combustion equipment are duplicated.

In such arrangements the fuel-pumps are driven independently, and each is preferably capable of delivering an adequate quantity of fuel to maintain substantially full-power delivery by the engine in the event of failure of either pump.

More specifically, this invention relates to internal combustion engine fuel-systems of the kind comprising a plurality of independently-driven fuel pumps the delivery of each of which is variable by means of a hydraulic pressure system controlling means defining the delivery of the pumps, and has for an object to avoid difficulties which may arise due to failure of a pump in operation.

According to this invention, there is provided a fuel system of the kind referred to in which the plurality of pumps deliver to a common point in the fuel system, and in which the hydraulic pressure system comprises a hydraulically-operated regulating device for each pump, hydraulic-control means which is common to the regulating devices and means responsive to a hydraulic pressure difference arising in the hydraulic pressure system on failure of the pressure in a regulating device or regulating devices to isolate this regulating device or these devices from the hydraulic control whilst maintaining the other regulating device or regulating devices in connection with the hydraulic control. With such a fuel system, in the event of failure and resultant isolation of one or more of the pumps, the delivery of the remaining pump or pumps is increased and the hydraulic control means continues to control the pumps.

Conveniently, said pressure responsive means is a valve which is located between a regulating device and the hydraulic control means and is subjected to the pressure in the hydraulic regulating device and in the hydraulic control normally to be held open thereby and arranged to be actuated by a pressure difference arising on failure of the pressure in the regulating means, to close and isolate the regulating device from hydraulic control.

According to a feature of this invention, there is provided a fuel system of the kind referred to comprising two pumps each capable of supplying substantially the full requirements of the engine and each delivering to a common point in the fuel system, a hydraulic regulating device associated with each pump to adjust its delivery, a common hydraulic control means for controlling said regulating devices, and normally-inoperative isolating means located between said regulating devices and their common hydraulic control, which isolating means is actuated by pressure difference arising as a result of failure of the pressure in a regulating device to isolate said regulating device from the common hydraulic control while maintaining the connection between the other regulating device and the hydraulic control whereby the pump associated with said other regulating device increases its delivery.

In one construction, said regulating devices are connected to a common point in the hydraulic control and said isolating means comprises a valve located at this point so as to be responsive to the pressures in the regulating devices and to isolate a regulating device on failure of the pressure in said regulating device. Preferably, the said valve comprises a pair of valve seats around ports leading respectively to the regulating devices and a member capable of occupying a position between the ports and on failure of pressure in a regulating device of being displaced to engage on the valve seat around the port leading to said regulating device. The said member may be a ball which is normally located to be free from the valve seats and which on failure of pressure in a regulating device is displaced to engage on the seat associated with said regulating device.

A preferred embodiment of this invention will now be described, by way of example, as applied to one hitherto known fuel system for a gas-turbine jet propulsion engine for an aeroplane. The description has reference to the accompanying drawings, in which:

Figure 1 is a diagrammatic view of the fuel system and engine as a whole,

Figure 2 is a diagrammatic view on a larger scale of that part of the fuel system with which the invention deals, and Figure 3 is a section through one practical embodiment of the isolating valve means.

Referring to Figure 1, the gas-turbine jet-engine 5, comprises a compressor 6, combustion chambers 7, a turbine 8 and a jet-pipe 9. Fuel is delivered to the combustion chambers 7 from a tank 10 by way of a filter 11, a fuel delivery control indicated generally within the dotted line 12, a shut-off cock 13 and main pipe line 15. The fuel is delivered under pressure by a pair of pumps 16, 17 which form part of the control as is explained in detail hereinafter. The two pumps are independently driven, for instance, they may both be driven independently from the engine 5 or one may be driven from the engine and the other driven by an electric motor, for example.

As is clear from Figure 2, the pumps 16, 17 are of the swash-plate type and each comprises a pump body 18, a plurality of plungers 19 therein, a spring 20 for each plunger urging it against the swash-plate 21, a common inlet 22 to the plunger barrels and a common outlet 23 therefrom. The swash-plate 21 is angularly adjustable by a linkage 24 to vary the effective stroke of the plungers and hence the delivery of the pump. Each pump is driven by a shaft 25.

Each pump 16, 17 receives a supply of fuel at low pressure from tank 10 by main pipe 26 and branch pipes 27 and they both deliver fuel under a high pressure to a main pipe 28 through a throttle valve 29 and thus to pipe 15 and the engine 5. The throttle valve gives the desired control of the engine in the usual manner being adjusted for opening and closing by lever 30. A pipeline 30A constitutes a drain pipe conducting leakage flow from the throttle 29 to pump intake pipe 27. The pipe 30A also provides a drain for leakage flow from the shut-off cock 13.

From the common outlets 23 of each pump, there is a pipe 31 connecting them to main pipe 28 and each pipe 31 communicates with a hydraulic regulating device, indicated at 32, by a port 33. The device comprises a ram 34 connected to the linkage 24 and a spring 35 urging the ram 34 to set the swash-plate 21 so that the maximum pump delivery is obtained. Both sides of the ram 34 communicate with port 33, one side (the spring-biased side) through a restricted orifice 36 and the other freely.

With this arrangement the ram 34 will be moved by the pressure differential existing across the ram, movement to the left causing an increase in the pump delivery (and hence in the pump-delivery pressure assuming that the throttle-valve 29 remains in a fixed position) whilst movement to the right results in a reduction in the pump delivery.

The pressure on the spring-biased side of each ram 34 is determined by a plate valve 41 which constitutes the hydraulic control means common to both devices. This valve 41 is urged to its closed position by a spring 42. The valve 41 is located at the end of a pipe line 44B which communicates by branches 44A with each regulating device 32. The pipes 31 carrying the fuel delivery pressure communicates through a common branch 37 with a cylinder 38 containing a piston 39 which operates on a rocking arm 40 carrying the closure member of the valve 41. The arm 40 is fulcrumed on a sealing diaphragm 14 and is adjusted by a barometric capsule 43 which varies the loading of spring 42 with changes of operational altitude of the aircraft. The arrangement above described, which has been hitherto known and used, is such that when a predetermined pressure is reached within the cylinder 38, i. e. when the fuel delivery pressure reaches a certain value, the piston 39 raises the arm 40 against the spring to open the valve 41.

The outflow through valve 41 is co-related with the flow through orifice 36, and if the outflow through valve 41 tends to exceed the flow through orifice 36, the pressure on the spring biased side of the ram 34 falls and the ram 34 moves to decrease the pump stroke and thus its delivery pressure. The reduction in delivery pressure results in the piston 39 reducing its loading on the arm 40 so that valve 41 tends to close under the action of spring 42 thereby increasing the pressure in the pipe lines 44a and 44b and maintaining this pressure at a desired pump delivery pressure. If the pressure in the outlet pipes 31 falls the opposite sequence of operations is followed, valve 41 closing to raise the pump delivery pressure. Fuel flowing through valve 41 is returned to the inlet pipe 27.

In addition, the spring-biased side of each ram 34 is provided with an outlet 45 controlled by the diaphragm controlled plate-valve 46. The diaphragm is subject to the centrifugal pressure generated in the chamber of the pump body 18 and it is arranged that at a predetermined rotational speed of the pump this pressure opens the valve 46 to enable fuel to escape from the regulating device and to effect a reduction in the pump stroke and its delivery pressure. The plate member of the valve 46 is carried on a rocking arm and is urged into the closed position by a spring 48 and in addition to being opened by a predetermined pressure on the diaphragm 47, the valve may be opened by the fuel pressure in the outlet 45 acting on the plate member when a predetermined fuel delivery pressure is reached and is communicated to it through the outlet.

The functioning of the pump arrangement is well known and does not in itself constitute a feature of this invention.

It will be appreciated that the pumps have separate regulating devices 32 which are controlled in their operation by a common hydraulic system constituted by pipe 44B and the plate valve 41, whereby the pumps are independently controlled similarly and simultaneously.

Each of the pumps 16, 17 is made of such capacity that it can supply substantially the full power requirements of the engine 5 if for any reason the other pump is rendered inoperative.

This invention provides means for isolating a pump which for any reason has failed, from the common hydraulic control. In the preferred form, this means comprises a valve body 49 having a pair of opposed ports 50 through which the branches 44a leading to the regulating devices 32 open into the body and a third port 51 disposed laterally of the other ports through which the branch 44b leading to valve 41 opens into the body. The ports 50 are formed as valve seats and a ball 52 is positioned in the body 49 so as to be capable of closing off one or the other of the branches to the regulating devices 32 whilst leaving the other open to the branch to the valve 41. The ball valve is thus in the nature of a shuttle valve.

In operation, the ball is normally held in a central position in which it closes neither of the ports 50, since there will be a flow through the body 49 from each of the branches 44a to the branch 44b.

However, should the pressure in either branch 44a drop due to the failure of the pump the ball will be displaced to close the corresponding port 50, thus isolating the associated pump from the common hydraulic control, while leaving the other pump in communication with the control.

Failure of the pressure in the branches 44a may occur for a number of reasons. For instance, the valve 46 may stick open, or the pump drive may fail or the branch 44a may be punctured. In any of these cases, the failed pump is isolated from the hydraulic control and the other pump will automatically increase its stroke to maintain, as far as possible, the full fuel requirements of the engine. In this way, excessive leakage of pressure fuel from the spring-biassed side of the ram 32 with the accompanying dangerous drop in fuel-delivery pressure, is avoided.

Referring now to Figure 3, there is illustrated one practical form of the isolating ball valve.

The isolating valve comprises a main body 60 formed with a chamber 61 to receive the ball member 62. The chamber wall comprises a number of peripherally-spaced central lands 63 on which the ball rests and at one end is formed with a valve seat 64 at the end of a port 65. The body is formed with an external flange 66 surrounding the port 65 and the isolating valve is supported from an end cover 67 of one of the pumps 16, 17 by the flange 66 engaging in a recess in the cover 67 surrounding the outlet 68 from the ram cylinder of the pump regulating means 32.

The isolating valve body 60 also carries an end plate 69 formed with a projection 70 which fits in the end of the chamber 61 and has a central bore 71 terminating in a second valve seat 72 for the ball 62. A union 73 is provided in the outer face of end-plate 69 for the connection of a branch pipe 44a to the other pump.

The valve body 60 is bored laterally to form a duct 74 opening at its inner end to the chamber 61 in a port which is located between a pair of the lands 63, and formed at its outer end with a union for the connection of a branch 44b.

Suitable seals 75 are provided between the body 60 and cover 67 and end plate 69.

Whilst the preferred embodiment of the invention described in conjunction with the drawings includes one known form of hydraulic control device, i. e. a valve loaded in combination by a spring and barometric capsule, it will be appreciated that other known or convenient hydraulic control means may be used in conjunction with the pump regulating devices. For example, one known form of fuel system for a gas-turbine engine includes two or more pumps as illustrated, having regulating devices 32 and a hydraulic control system including pipe lines 44a and 44b, the outflow from which is regulated by a valve similar to that shown at 41. The valve 41 is, however, loaded in accordance with the pressure drop existing across the throttle in the fuel delivery pipe to the engine. Such an arrangement basically provides for the maintenance of a constant pressure drop to exist across the throttle. In such an arrangement the area of the throttle metering orifice may be made a function of both altitude and the power setting manually selected by the pilot.

In the application of the invention to such a system considerable advantage is obtained in the maintenance of the remaining regulating device under the control of the hydraulic control means, in the event of the failure of one of the regulating devices.

I claim:

1. In a fuel system of the kind referred to a plurality of pumps delivering to a common point in the system; a hydraulic pressure system comprising a hydraulically operated regulating device for each pump, hydraulic control means which is common to the regulating devices, and ducts one from each of said regulating devices to said control means; a normally open valve in at least one of said ducts; and pressure responsive means responsive to a hydraulic pressure difference arising in said system on failure of the pressure in the regulating device from which said one of said ducts leads, and connected on responding to said pressure difference to close said valve; whereby when said pressure difference arises said regulating device from which said one of said duct leads is isolated from said hydraulic control means, and the remainder of said regulating devices is left in connection with said hydraulic control means.

2. A fuel system as claimed in claim 1 wherein said valve has a movable member and a fixed seat and said movable member constitutes said pressure responsive means.

3. A fuel system comprising two pumps each capable of supplying substantially the full requirements of the engine and each delivering to a common point in the fuel system, a hydraulic regulating device associated with each pump to adjust its delivery, a common hydraulic control means for controlling said regulating devices, and normally-inoperative isolating means located between said regulating devices and their common hydraulic control, which isolating means is actuated by pressure difference arising on failure of the pressure in a regulating device to isolate said regulating device from the common hydraulic control while maintaining the connection between the other regulating device and the hydraulic control means, whereby the pump associated with said other regulating device increases its delivery.

4. A fuel-system as claimed in claim 3, wherein said regulating devices are connected to a common point of the common hydraulic control means and said normally inoperative isolating means comprises a valve located at this point so as to be responsive to the pressures in the regulating devices and to isolate a regulating device on failure of the pressure in said regulating device.

5. A fuel-system as claimed in claim 4, wherein said valve comprises a pair of valve seats around ports leading respectively to the regulating devices and a member capable of occupying a position between the ports and on failure of pressure in a regulating device of being displaced to engage on the valve seat around the port leading to said regulating device.

6. A fuel system as claimed in claim 3, wherein said normally inoperative isolating means comprises a valve body formed with a pair of valve seats around oppositely disposed ports respectively communicating with the regulating devices and having a third port opening into the valve body laterally of the first said ports and communicating with the common hydraulic control means, and a ball member which is arranged normally to occupy a position disengaged from the valve seats so that the three ports communicate one with the other but is capable of being displaced on failure of pressure in a regulating device to engage on the seat around the port associated with this regulating device and to isolate this regulating device from communication with the third port.

7. In a fuel system of the kind referred to having a plurality of pumps delivering to a common point in the system; a hydraulic pressure system comprising a hydraulically-operated regulating device for each pump, hydraulic control means which is common to the regulating devices, a valve body, a duct from said control means to the interior of said valve body, a plurality of further ducts extending each from the interior of said valve body to one of said regulating devices, and each terminating in said valve body with a valve seat, and a single pressure-responsive valve member in said valve body responsive to a hydraulic pressure difference arising in said system on failure of pressure in any one of said regulating devices, and arranged, on responding to such pressure difference, to co-operate with the valve seat of the duct leading to such regulating device, to isolate such regulating device from said control means, said valve member being normally spaced from said valve seats.

8. A fuel system according to claim 7 wherein said valve member is a ball.

CHARLES GORDON MORLEY.

No references cited.